(No Model.)

G. C. MOORE.
MECHANICAL MOVEMENT.

No. 454,539. Patented June 23, 1891.

Witnesses:
A. T. Cushman.
Robert Everett.

Inventor:
George C. Moore,
by Henry Baker
Atty.

UNITED STATES PATENT OFFICE.

GEORGE C. MOORE, OF EASTHAMPTON, MASSACHUSETTS, ASSIGNOR TO JOSEPH W. GREEN, JR., OF SAME PLACE.

MECHANICAL MOVEMENT.

SPECIFICATION forming part of Letters Patent No. 454,539, dated June 23, 1891.

Application filed October 16, 1890. Serial No. 368,272. (No model.)

*To all whom it may concern:*

Be it known that I, GEORGE C. MOORE, a citizen of the United States, residing at Easthampton, in the county of Hampshire and State of Massachusetts, have invented certain new and useful Improvements in Mechanical Movements, of which the following is a specification, reference being had therein to the accompanying drawings.

My invention has for its object to provide a simple mechanical movement by which a variable vibrating motion may be imparted to a lever from a uniformly-rotating crank disk or wheel. To this end the lever to be operated is provided at one end with a slot, in which works a slide having a pin entering a curved guideway or an arc-of-a-circle slot in a stationary frame or plate, said pin being connected by a pitman with the rotating crank disk or wheel. The curved slot is so arranged as to bend inward toward the fulcrum of the lever, so that as the said crank disk or wheel rotates and the said lever is vibrated the slide working in the slot of said lever will be caused to approach the fulcrum of the latter during the middle of the movement of the lever and to recede from said fulcrum as the lever approaches either end of its movement, so that the lever will start or stop slowly, but it will move more rapidly during the middle of its stroke.

My invention is specially applicable to the shuttle-operating mechanism of looms, but may be used in various other machines.

Figure 1:
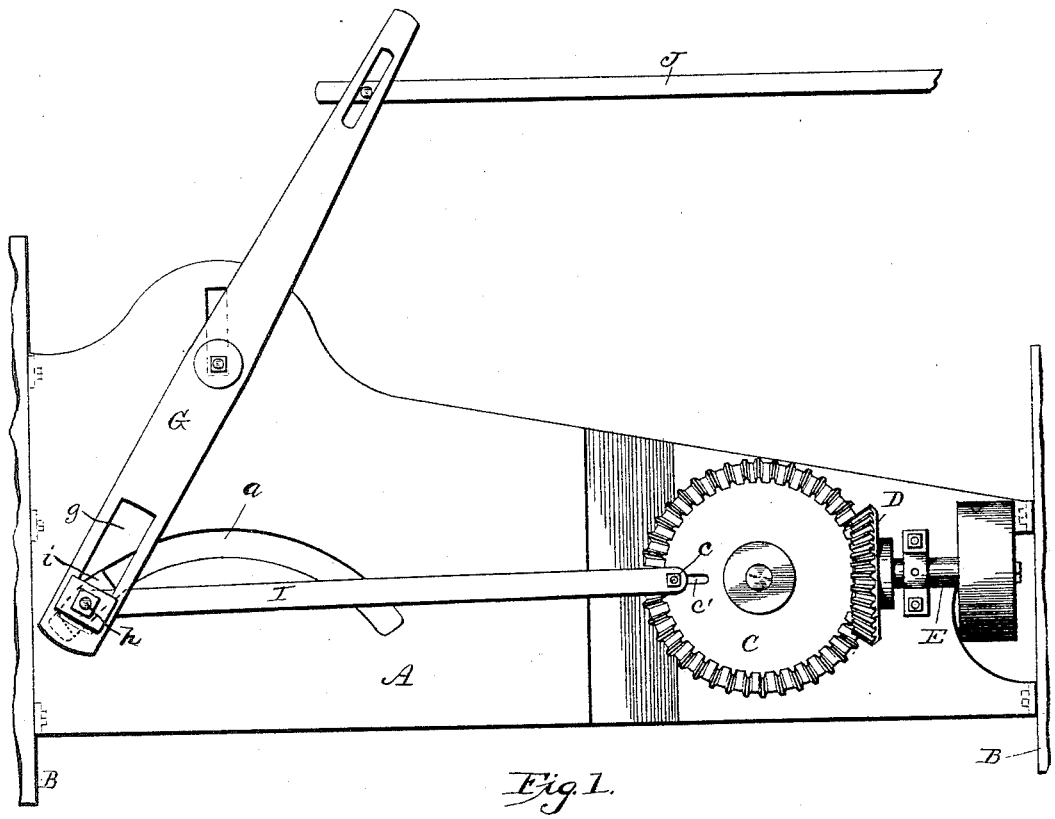
Figure 2:
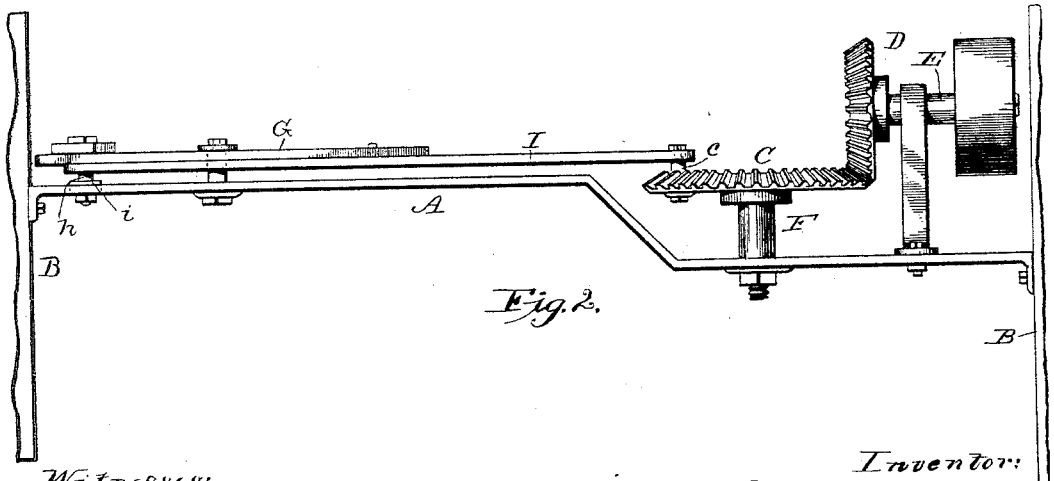

In the accompanying drawings, Figure 1 is a plan view of a mechanism embodying my invention, and Fig. 2 is a side view thereof.

A denotes a frame or plate, which may be supported by suitable uprights, as B.

C denotes a crank disk or wheel, herein shown as a bevel-gear, meshing with a smaller bevel-gear D on a driving-shaft E, which shaft may be the crank-shaft of a loom, said crank disk or wheel being journaled on a stud F, attached to the frame or plate A.

G is the operated lever, and is provided at one end with a slot $g$, in which works a suitable slide, connected by a pin $h$ with one end of a pitman I, and the other end of the latter is connected to the crank-pin $c$ of the said disk or wheel C. The pitman I is preferably provided with a slide or block $i$, through which the said pin $h$ passes, and which is received in the curved slot $a$ in the plate or frame A. The crank-pin $c$ may be adjustable in a slot $c'$ in the crank-disk, so that its throw may be varied, and the lever G may be joined to a connecting rod or bar J, which, if the invention be applied to a loom, may operate the shuttle-driver.

From the foregoing it will be apparent that as the crank-disk C is rotated the lever G will be vibrated, but as the connection of the pitman I with the said lever will be nearer the fulcrum of said lever during the middle of the stroke of the latter than during the beginning and end of the stroke the said lever will first start slowly, then move more rapidly, then decrease in speed until it comes to the dwell at the end of its stroke. Thus said lever will work much more smoothly and with less jar than it would without the traveling connection of the pitman in the slotted end thereof—a great advantage in fast-running machinery.

Having thus described my invention, I claim and desire to secure by Letters Patent—

1. The combination, with a rotating wheel, of a plate or frame having a curved slot, a lever to be operated, and a pitman connected at one end with said wheel and at the other with the said curved slot and lever, and thus having a sliding or traveling connection with the latter, substantially as set forth.

2. The combination, with the plate A, having the curved slot $a$, of the rotating wheel C, having crank-pin $c$, the lever G, having the slot $g$, the pin $h$, entering a slide movable in said slot $g$, and the pitman I, connected to said crank-pin at one end and provided at its opposite end with a slide connected to said pin $h$ and working in said curved slot $a$, substantially as set forth.

In testimony whereof I affix my signature in presence of two witnesses.

GEORGE C. MOORE.

Witnesses:
JOS. W. GREEN, Jr.,
C. H. JOHNSON.